United States Patent Office 3,244,980
Patented Apr. 5, 1966

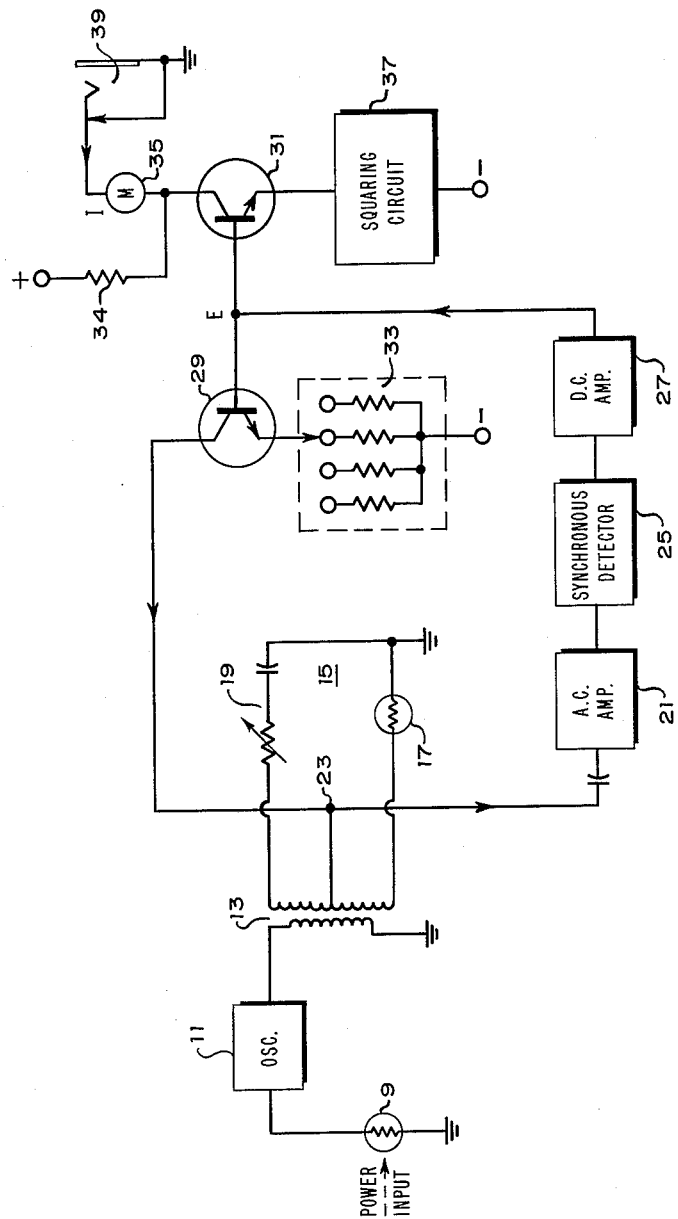

3,244,980
POWER METER CONTROL CIRCUIT EMPLOYING SELF-BALANCING FEEDBACK LOOP
Georg C. Jung, Menlo Park, and Robert F. Pramann, Mountain View, Calif., assignors to Hewlett-Packard Company, Palo Alto, Calif., a corporation of California
Filed Mar. 8, 1962, Ser. No. 178,413
3 Claims. (Cl. 324—106)

This invention relates to power meter circuits and more particularly to a self-balancing bridge circuit used in a microwave power meter to provide a linear indication of the microwave power under test and to provide zero adjustment for the indicating meter.

Microwave power meters using thermistors in self-balancing loops are described in U.S. patent application Serial Number 99,526, now Patent No. 3,158,807. The second loop or slave circuit in this type of power meter receives an oscillatory signal having an amplitude related to the microwave power to be measured. This signal tends to unbalance the thermistor bridge circuit. The unbalance signal produced by the bridge circuit, without more, provides an indication of the applied microwave power. This indication is compensated for ambient temperatures but is not very accurate over a wide dynamic range. By including the thermistor bridge circuit in a feedback loop, high measurement accuracy over a wide dynamic range is obtained since the bridge is balanced for all values of applied microwave power. The power indication is thus derived from the feedback signal required to maintain bridge balance.

In power meters of this type, it is desirable to obtain a linear meter indication of power. It is also desirable to maintain the indicating meter at ground potential and still operate it within the feedback loop. This eliminates the need for "floating" a graphic recorder or other external load above ground when connected to the indicating meter of the instrument. In addition, it is desirable to provide a zero control in the meter circuit which produces not only positive deflections but also negative deflections about zero indication. This feature permits the instrument to be adjusted initially without breaking the feedback loop as was heretofore required to produce a meter deflection below zero.

It is an object of the present invention to provide a meter circuit for a microwave power meter and which provides a linear indication of applied power.

It is another object of the present invention to provide a feedback circuit containing an indicating meter for a power meter and which connects the meter at ground potential.

It is still another object of the present invention to provide a feedback circuit including an indicating meter and having a meter circuit which provides positive and negative meter deflections about zero indication without breaking the loop.

In accordance with the illustrated embodiment of the present invention a signal having substantially constant frequency and having an amplitude that is related to the applied microwave power is applied to a thermistor bridge circuit. This applied signal tends to unbalance the bridge circuit. The signal produced by the bridge unbalance is amplified and synchronously detected at the same frequency as the applied signal to produce a direct current signal proportional to the bridge unbalance. The direct current signal is applied simultaneously to a controllable current source and to an indicating circuit. The output of the current source is returned to the thermistor bridge circuit to keep the bridge in the balanced condition. The indicating circuit includes a squaring circuit which establishes the linear relationship between the meter indication and the applied microwave power.

Other and incidental objects of the present invention will be apparent from a reading of this specification and an inspection of the accompanying drawing which shows a schematic diagram of the circuit of the present invention.

Referring now to the drawing, a signal having substantially constant frequency and having an amplitude that is related to the power applied to thermistor 9 is applied by oscillator 11 to the primary winding of transformer 13. In practice, the oscillator 11 comprises elements including thermistor 9 so arranged in a bridge circuit that the thermistor 9 is maintained at the bridge-balancing value of resistance for all values of applied power. The signal from oscillator 11 is received by bridge circuit 15 which comprises the secondary windings of transformer 13 and each of thermistor 17 and impedance network 19 connected between an end terminal of the secondary windings and ground. The alternating current signal on tap 23 of the secondary winding is amplified by A.C. amplifier 21 and is synchronously detected at the frequency of oscillator 11 by the detector 25. The synchronous detector 25 receives a signal from oscillator 11 and operates in a known manner to produce a D.C. signal of one polarity for a selected phase relationship between the signal at tap 23 and the signal supplied to transformer 13. The direct current signal produced by the detector 25 is amplified by D.C. amplifier 27 and is applied simultaneously to the input circuits of each of transistors 29 and 31. A plurality of resistors and a selector switch 33 connected in the input circuit of transistor 29 provide a range attenuator for selecting the ranges of indicated power. The direct current output of transistor 29 is applied to the thermistor 17 of the bridge circuit through the tap 23 and secondary winding of transformer 13. Signals applied to the bridge circuit 15 by oscillator 11 which tend to unbalance the bridge are counteracted by the direct current signal from transistor 29. The bridge circuit is thus maintained in the balanced condition for all values of applied microwave power.

At the same time, the direct current output from D.C. amplifier 27 having an amplitude E is applied to the input circuit of transistor 31. The output of the transistor 31 is connected to the indicating meter 35 and to the output connector 39 which is connected at ground potential. The squaring circuit 37 in the input circuit of transistor 31 establishes the relationship that the current I in indicating meter 35 is proportional to the square of the D.C. voltage E. The indicating meter 35 thus provides linear indications of the microwave power applied to thermistor 9.

Temperature compensation is obtained in the present invention by maintaining both thermistor 9 and thermistor 17 substantially at the same ambient temperature. If the resistance-temperature characteristics of the thermistors are matched then the circuit is unaffected by changes in the ambient temperature.

Adjustments of the meter 35 about zero indication may be made by adjusting the impedance network 19 about the normal operating value of the thermistor 17. A small amount of current is provided by resistor 34 to drive the indicating meter 35 below the zero indication. Transistor 31 is biased by a voltage E on its base electrode to provide a current which equals and opposes the current provided by resistor 34. By adjusting resistor 19, the effect of the current which flows in the bridge circuit from transistor 29 as a result of the bias voltage E is reduced. The small unbalance signal is amplified and detected to provide the biasing voltage E on the base electrodes of transistors 29 and 31. The feedback loop thus remains operative as resistor 19 is adjusted to deflect the indicating meter 35 below the zero indication. The current from transistor 29 changes as the range attenuation is adjusted. The gain of amplifier 21 is thus made adjustable along with the range attenuator in order to maintain the detected voltage on the base electrodes of transistors 29 and 31 substantially constant with range selection.

The output of transistor 29 approximates a current source, the amplitude of which is controlled by the D.C. voltage E. Thus, minor variations in the impedance of the bridge circuit about the balance condition do not affect the amplitude of the voltage E required to maintain the bridge balanced. The proportionality between the voltage E and the current I in the indicating circuit is unaffected and hence the meter indication also is unaffected by minor changes in the impedance of the bridge circuit.

An external load may be connected at ground potential in the indicating circuit using the output connector 39. This obviates the need for floating an external load when connected in the indicating circuit. In addition, the output of transistor 31 approximates a current source, the amplitude of which is determined by the voltage E. Thus, an increase in the impedance to ground of the path for the current I due to the connection of an external load does not affect the meter indication.

Therefore, the circuit of the present invention provides linear indications of applied power over a wide dynamic range of values. High measurement accuracy is maintained by compensating the circuit thermistors for changes in ambient temperature and by providing controllable current sources to drive both the thermistor bridge circuit and the indicating meter. In addition, electrical adjustment of the meter both above and below zero indication while maintaining the feedback loop operative is made possible using the circuit of the present invention. Further, external loads may be connected at ground potential in the indicating circuit without affecting the accuracy of the power indication.

We claim:

1. A control circuit for a power-measuring meter, the circuit comprising a transformer having primary and secondary windings, the secondary winding having end terminals and a tap, means connected to the primary winding for applying a signal thereto having an amplitude related to the power to be measured, a heat-sensitive element and an impedance serially connected between the end terminals of said secondary winding to form a bridge circuit therewith, means connected to said tap for producing a unidirectional signal related to the amplitude of the signal appearing at said tap, first and second amplifiers, each having three electrodes forming input and output circuits, a range attenuator for the first amplifier, means including the range attenuator to apply said unidirectional signal to the input of the first amplifier, direct-current conducting means connecting the output of the first amplifier and said tap, a shaping circuit having an impedance related to the voltage applied thereto, means including the shaping circuit to apply said unidirectional signal to the input of the second amplifier, indicating means connected to receive the output of the second amplifier, and means connected to said indicating means for applying a direct current thereto in a sense opposite to the current received from the output of the second amplifier.

2. A control circuit for a power-measuring meter, the circuit comprising a transformer having primary and secondary windings, the secondary winding having end terminals and a tap, means connected to the primary winding for applying a signal thereto of pre-selected frequency and having an amplitude related to the power to be measured, a heat-sensitive element and an impedance serially connected between the end terminals of said secondary winding to form a bridge circuit therewith means including a detector operating at a frequency related to said preselected frequency and connected to said tap for producing a unidirectional signal related to the amplitude of the signal appearing at said tap, first and second amplifiers, each having three electrodes forming input and output circuits, a range attenuator for the first amplifier, means including the range attenuator to apply said unidirectional signal to the input of the first amplifier, direct-current conducting means connecting the output of the first amplifier and said tap, a shaping circuit having an impedance related to the voltage applied thereto, means including the shaping circuit to apply the unidirectional signal to the input of the second amplifier, an indicating meter connected to receive the output of the second amplifier, and means connected to said indicating meter for applying a direct current thereto which opposes the current received by said meter from the second amplifier.

3. A control circuit for a power-measuring meter, said circuit comprising: a bridge circuit having a heat-sensitive element in one arm and an impedance in another arm thereof; means connected to said bridge for applying across one set of diagonal terminals thereof a signal of one frequency having an amplitude related to the power to be measured; circuit means connected to said bridge for producing a control signal of another frequency having an amplitude related to the signal appearing across the other set of diagonal terminals of the bridge; indicating means for producing indications about a reference level of the amplitudes of electrical signals applied thereto; means including said indicating means connected to receive said control signal for applying the control signal to the heat-sensitive element of said bridge in proper sense to maintain bridge balance; said indicating means providing an indication above said reference level related to the amplitude of the control signal applied to said heat-sensitive element; and bias means connected to said indicating means to supply an electrical signal thereto in proper sense tending to produce an indication below said reference level; the value of said impedance being selected to unbalance the bridge sufficiently for said circuit means to produce a control signal equal and opposite to the electrical signal supplied to said indicating means by said bias means.

References Cited by the Examiner

UNITED STATES PATENTS 2,919,345  12/1959  Houghton _____ 324—99
2,997,652  8/1961   Engen _____ 324—99
3,048,778  8/1962   Rumpel _____ 324—99 X WALTER L. CARLSON, *Primary Examiner.*

FREDERICK M. STRADER, *Examiner.*

D. R. GREENE, J. MULROONEY, *Assistant Examiners.*